(12) United States Patent
Tan et al.

(10) Patent No.: US 9,067,591 B2
(45) Date of Patent: Jun. 30, 2015

(54) HYBRID VEHICLE PROPEL-CHARGE BIAS CONTROL METHOD

(75) Inventors: Teik-Khoon Tan, Troy, MI (US); Cheng Chen, Fort Wayne, IN (US); Hyun-Sung Choi, Lake Zurich, IL (US); Matthew David Hunkler, Fort Wayne, IN (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 0 days.

(21) Appl. No.: 14/348,119

(22) PCT Filed: Nov. 30, 2011

(86) PCT No.: PCT/US2011/062638
§ 371 (c)(1),
(2), (4) Date: Mar. 28, 2014

(87) PCT Pub. No.: WO2013/081604
PCT Pub. Date: Jun. 6, 2013

(65) Prior Publication Data
US 2014/0257615 A1    Sep. 11, 2014

(51) Int. Cl.
*B60W 20/00* (2006.01)
*B60W 10/06* (2006.01)
*B60W 10/08* (2006.01)
*B60W 10/26* (2006.01)
*B60K 6/48* (2007.10)

(52) U.S. Cl.
CPC ............... *B60W 20/106* (2013.01); *B60K 6/48* (2013.01); *B60W 2510/244* (2013.01); *Y02T 10/6221* (2013.01); *B60W 10/06* (2013.01); *B60W 10/08* (2013.01); *B60W 10/26* (2013.01); *Y10S 903/93* (2013.01)

(58) Field of Classification Search
USPC ........... 701/22, 31.4, 29.2, 33.5, 64; 903/930, 903/946; 180/65.265, 65.22, 65.23, 65.245; 475/5, 280; 477/109
See application file for complete search history.

(56) References Cited

U.S. PATENT DOCUMENTS

| | | | |
|---|---|---|---|
| 7,967,711 B2* | 6/2011 | Conlon et al. | 475/5 |
| 8,083,626 B2* | 12/2011 | Conlon et al. | 475/5 |
| 8,317,646 B2* | 11/2012 | Si | 475/5 |
| 8,565,949 B2* | 10/2013 | Christman et al. | 701/22 |
| 8,721,491 B2* | 5/2014 | Wittkopp et al. | 475/280 |
| 2013/0096746 A1* | 4/2013 | Hussain et al. | 701/22 |

OTHER PUBLICATIONS

Search Report from parent PCT application, mailing date Mar. 20, 2012.

* cited by examiner

*Primary Examiner* — Marthe Marc-Coleman
(74) *Attorney, Agent, or Firm* — Jeffrey P. Calfa; Mark C. Bach

(57) ABSTRACT

A hybrid-electric vehicle carries batteries for storing reserve electrical power. The batteries have a state of charge which is monitored by a control system. The state of charge indicates the amount of reserve electrical power available and, under some conditions, the rate at which reserve electrical power can be sourced as electric current. The vehicle further includes an internal combustion engine which can, depending upon vehicle configuration, be used to propel the vehicle, to drive an electrical machine to source electric current for storage, or to drive the electrical machine to source electric current to power a traction motor(s). The control system provides, in response to operator requests for propulsion and in response to the state of charge of the batteries, for allocating available power between propulsion and battery charging.

2 Claims, 8 Drawing Sheets

HYBRID VEHICLE PROPEL-CHARGE BIAS CONTROL METHOD

BACKGROUND

1. Technical Field

The technical field relates generally to hybrid-electric motor vehicles and, more particularly, to allocation of immediately available power, particularly engine generated power, between propulsion and traction battery charging.

2. Description of the Technical Field

Electrical motors generally exhibit greater operating efficiencies than do internal combustion engines. In addition, internal combustion engines achieve their maximum efficiencies over relatively narrow RPM and torque ranges in comparison to electrical motors. Consequently there is a built in bias in favor of using electrical motors over an internal combustion engine for propulsion on hybrid-electric vehicles and to running internal combustion engines when they can operated at efficient brake specific fuel consumptions.

The bias in favor of using electrical motors is constrained by the inherent limitations of the batteries commonly used to provide a reserve of electrical power. In contrast to the hydrocarbon fuels usually used with internal combustion engines, contemporary batteries have a much higher mass per unit of energy stored. Batteries also exhibit limitations in terms of the rate at which they can be discharged and recharged. If a hybrid-electric vehicle is in use a large proportion of the time and is called on to operate over distances exceeding the capacity of the batteries to carry the vehicle it is unavoidable that the internal combustion engine will be run. The question becomes one of how to run the internal combustion engine in an efficient manner in order to meet vehicle operational goals. These goals can be maximizing vehicle range, minimizing vehicle operating cost for repeated daily operation over a course of fixed length, or minimizing down time for battery recharging.

SUMMARY

A hybrid-electric vehicle uses batteries for storing reserve electrical power. The batteries have a state of charge which is monitored by a control system. The state of charge indicates the amount of reserve electrical power available and, under some conditions, the rate at which reserve electrical power can be sourced as electric current. The vehicle includes an internal combustion engine which can, depending upon vehicle configuration, be used to propel the vehicle directly, or to drive an electrical machine to generate current to charge the batteries and to power a traction motor(s). The traction motor may be the same as the electrical machine. The hybrid-electric vehicle drive train supports a propel mode which can include the internal combustion engine and the electric motors where a charging mode is the motor/generator absorbs torque from the engine (or from the drive wheels). The control system provides, in response to operator requests for propulsion and in response to the state of charge of the batteries, for allocating available power between propulsion and battery charging. Charging and propelling can occur separately or concurrently. A hybrid supervisory control module directs which power source supports propulsion and to what extent, without considering battery SOC. A propel-charge bias (PCB) function is provided to direct the hybrid supervisory control module to consider battery SOC. In response to PCB the hybrid supervisory control module may be free of battery SOC constraint or may be indexed up to directing all power to battery charging.

DETAILED DESCRIPTION

Figure 1:
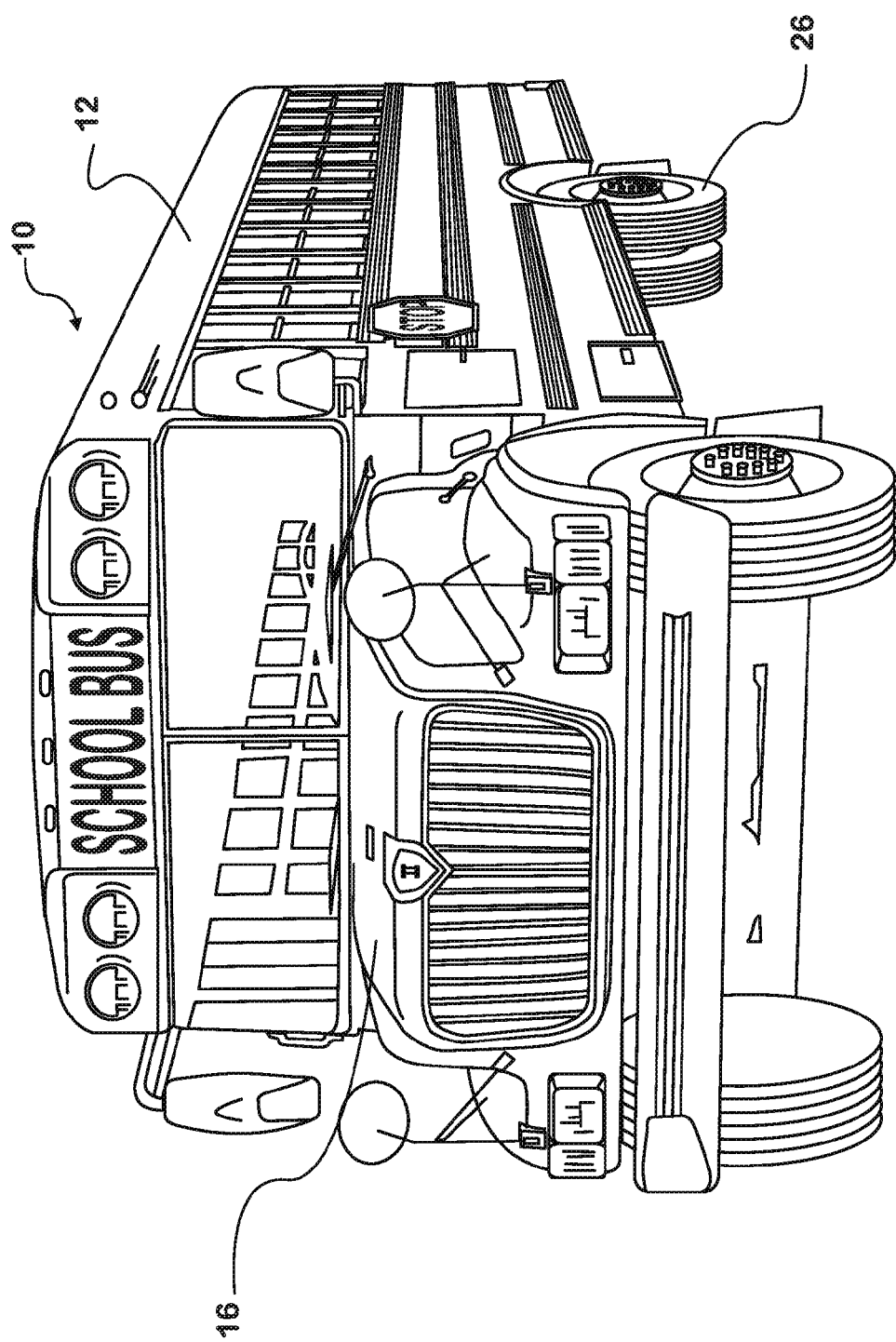
FIG. 1 is a perspective view of a bus which may be equipped as a hybrid-electric vehicle.

In the following detailed description, like reference numerals and characters may be used to designate identical, corresponding, or similar components in differing drawing figures.

Figure 2:
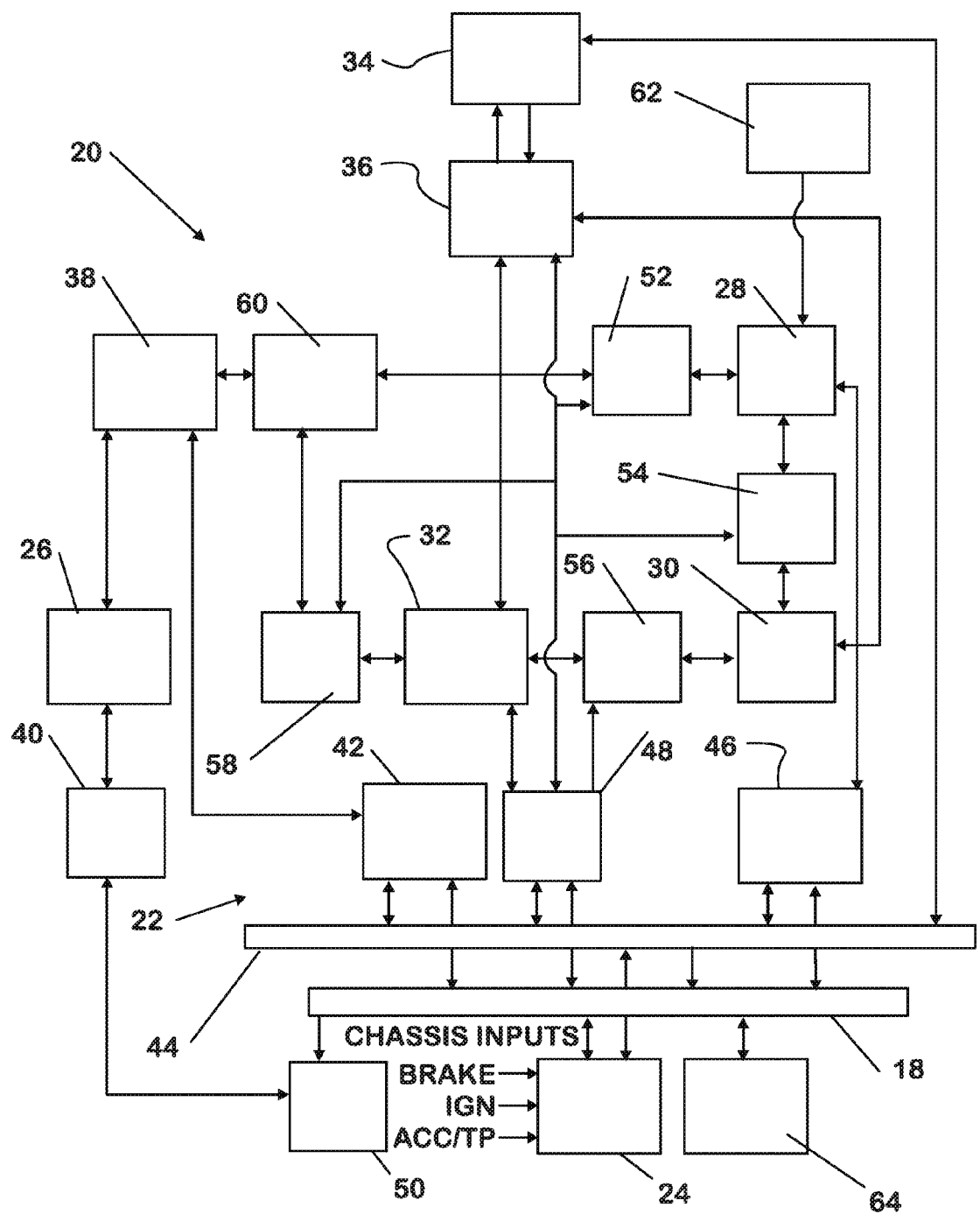
FIG. 2 is a high level block diagram of a control system for a hybrid-electric drive train for a motor vehicle such as the bus of FIG. 1.

Referring now to the figures and in particular to FIG. 1, a bus 10 is shown. Bus 10 includes a body 12 which includes an engine compartment 16 at the front of the bus and is one category of vehicle which can be configured as a hybrid-electric vehicle employing a hybrid-electric drive train such as hybrid-electric drive train 20 illustrated in FIG. 2. A hybrid-electric drive train may in part be located in an engine compartment 16. The hybrid-electric drive train provides traction power to drive wheels 26. Often such drive trains can complement vehicle braking by coupling the drive wheels 26 to back drive an electric motor/generator and thereby recapture and transform for storage a portion of the vehicle's kinetic energy during braking to slow or stop bus 10. Such braking is called regenerative braking FIG. 2 is a high level schematic of a control system 22 for a hybrid-electric drive train 20 which serves here as one of many possible examples of drive trains to which a system for varying the propulsion/charging bias can be applied. Hybrid-electric drive train 22 is configurable for series, parallel and mixed operation and illustrates the multiple environments to which the disclosed strategy may be applied. Hybrid-electric drive train 20 includes an internal combustion (IC) engine 28 and two electrical machines, dual mode electrical motor/generators 30, 32. The dual mode electrical motor/generators 30, 32 can serve as electric propulsion devices or can generate electricity either through regenerative braking of drive wheels 26 or by being directly driven by the IC 28 engine. In hybrid-electric drive train 20 the IC engine 28 can provide direct propulsion torque but in some hybrid-electric drive train configurations is limited to driving the electrical motor/generators 30, 32. Hybrid-electric drive train 20 also includes a planetary gear 60 for combining power output from the IC engine 28 with power output from the two electrical motor/generators 30, 32. A transmission 38 couples the planetary gear 60 with the drive wheels 26. Power can be transmitted in either direction through transmission 38 and planetary gear 60 between the propulsion sources and drive wheels 26. During braking planetary gear 60 can distribute torque from the drive wheels 26 to the motor/generators 30, 32 and engine 28.

A plurality of clutches 52, 54, 56 and 58 provide various options for configuring the electrical motor/generators 30, 32 and the engine 28 to propel the vehicle through application of torque to the drive wheels 26, to generate electricity by driving the electrical motor/generators 30, 32 from the engine, and to generate electricity from the electrical motor/generators 30, 32 by back driving them from the drive wheels 26. Electrical motor/generators 30, 32 may be run in traction motor mode to power drive wheels 26 or they may be back driven from drive wheels 26 to function as electrical generators when clutches 56 and 58 are engaged. Electrical motor/generator 32 may be run in traction motor mode or generator mode while coupled to drive wheels 26 by clutch 58, planetary gear 60 and transmission 38 while at the same time clutch 56 is disengaged allowing electrical motor/generator 30 to be back driven through clutch 54 from engine 28 to operate as a generator. Conversely clutch 56 may be disengaged and clutch 58 engaged and both motor/generators 30, 32 run in motor mode. In this configuration motor/generator 32 can propel the vehicle while motor/generator 30 is used to crank engine 28. Clutch 52 may be engaged to allow the use of engine 28 to propel the vehicle or to allow use of the engine, if equipped with a "Jake brake," to supplement vehicle braking. When clutches 52 and 54 are engaged and clutch 56 is disengaged, engine 28 can concurrently propel the vehicle and drive motor/generator 30 to generate electricity. Still further operational configurations are possible although not all are used. Elimination of some configurations can allow clutch 58 to be considered as "optional" and to be replaced with a permanent coupling.

Hybrid-electric vehicles have generally been of one of two types, parallel and series. In parallel hybrid-electric systems an electrical motor, a fuel burning engine, or a combination of both "in parallel" can supply torque directly to the drive wheels 26. In series systems drive propulsion is directly provided only by an electrical motor. An internal combustion engine is used to run a generator which supplies power to the electric motor and to batteries. In a series system the internal combustion engine is usually run sporadically and then only at its most efficient brake specific fuel consumption output level.

The clutch arrangement of drive train 20 allows hybrid-electric drive train 20 to be configured to operate in a "parallel" mode, in a "series" mode, or in a blended "series/parallel" mode. To configure drive train 20 for series mode operation clutches 54 and 58 could be engaged and clutches 52 and 56 disengaged. Propulsion power is then provided by motor/generator 32 and motor/generator 30 operates as a generator. To implement drive train 20 for parallel mode operation at least clutches 52 and 58 are engaged. Clutch 54 is disengaged. Motor/generator 32 and IC engine 28 are available to provide direct propulsion. Motor/generator 30 may be used for propulsion. A configuration of drive train 20 providing a mixed parallel/series mode has clutches 52, 54 and 58 engaged and clutch 56 disengaged. Motor/generator 32 operates as a motor to provide propulsion or in a regenerative mode to supplement braking IC engine 28 operates to provide propulsion and to drive motor/generator 30 as a generator.

Hybrid-electric drive train 20 draws on two reserves of energy, one for the electrical motor/generators 30, 32 and one for the IC engine 28. Electrical energy for the motor/generators 30, 32 may be stored directly in capacitors but more commonly is sourced from batteries 34. Either storage system is subject to a maximum energy storage limit. Batteries 34 also exhibit limited rates of charging and discharging. The availability of power from the electrical power reserve may be referred to as its state of energization (SOE) or, more usually with batteries, as its state of charge (SOC). In either case the value is indicated as a percentage. Combustible fuel for engine 28 is typically a hydro-carbon and, if liquid or gaseous, may be stored in a fuel tank 62. The fuel tank 62 is resupplied from external sources.

Traction batteries 34 may be charged from external sources or by operation of the drive train 20. As already described, electrical motor/generators 30 and 32 may be operated as generators to supply current to recharge traction batteries 34 with power converter 36 providing voltage step down or step up and, if motor/generators 30, 32 are alternating current devices, current rectification for battery 34 charging. Reserved or stored energy may, in effect, be converted to electrical energy and moved from the fuel tank 62 to the traction batteries 34. Traction batteries 34 may also be recharged through regenerative braking Control over drive train 20, the power converter 36 and traction batteries 34 is implemented by a control system 22. Control system 22 may be implemented using two controller area networks (CAN) based on a public data link 18 and a hybrid system data link 44. Control system 22 coordinates operation of the elements of the drive train 20 and the service brakes 40 in response to operator/driver commands to move (ACC/TP) and stop (BRAKE) the vehicle. Energy reserves in terms of the SOC of traction batteries 34 are managed taking into account the operator commands. The control system 22 selects how to respond to the operator commands to meet programmed objectives including efficiently maintaining the SOC of traction batteries 34.

In addition to the data links 18, 44, control system 22 includes the controllers which broadcast and receive data and instructions over the data links. Among these controllers is an Electronics System Controller (ESC) 24. ESC 24 is a type of body computer and is not assigned to a particular vehicle system. ESC 24 has various supervisory roles and is connected to receive directly or indirectly various operator/driver inputs/commands including brake pedal position (BRAKE), ignition switch position (IGN) and accelerator pedal/throttle position (ACC/TP). In response to these and other signals ESC 24 generates messages/commands which may be broadcast over data link 18 or data link 44 to an anti-lock brake system (ABS) controller 50, the gauge cluster controller 48, the transmission controller 42, the engine control unit (ECU) 46 and hybrid controller 48.

Table I illustrates possible drive train 20 configurations related to traction batteries 34 SOC and vehicle operating conditions. The possible configurations are mixed series/parallel, parallel and series. The term "Regen Mode" refers to one of the motor/generators operating as a generator while being back driven from the drive wheels 26. A motor operating in a generator mode is driven by the engine 28. Clutch 58 is engaged for all examples. Propelling source, charging source and propel less charging source are listed in propel units. As described below, propel-charge bias (PCB) may be used to select an architecture/configuration from the universal drive train 20 referred to.

Figure 7:
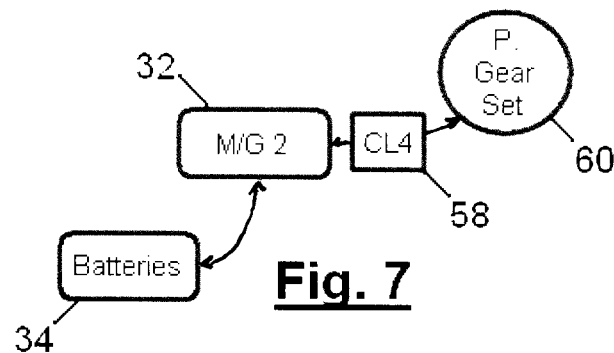
FIG. 7 is a diagram of certain elements shown in FIG. 2 in operational condition corresponding to the Light Load configuration in the second column of TABLE I.

FIG. 7 is a diagram illustrating certain elements of FIG. 2 which are operational to place drive train 20 in the Light Load configuration described in the second column of TABLE I. Clutches 52, 54, and 56 can be considered first, second, and third clutches respectively. They are disengaged and therefore not shown in FIG. 7. Clutch 58 can be considered a fourth clutch and is engaged. Electric motor/generator 30 can be considered a first electric motor/generator, and electric motor/generator 32 can be considered a second electric motor/generator. First electric motor/generator 30 does not appear in FIG. 7. Second electric motor/generator 32 operates as a traction motor powered by batteries 34 to provide the entire drive for driving drive wheels 26 through clutch 58, planetary gear set 60, and transmission 38.

Figure 8:
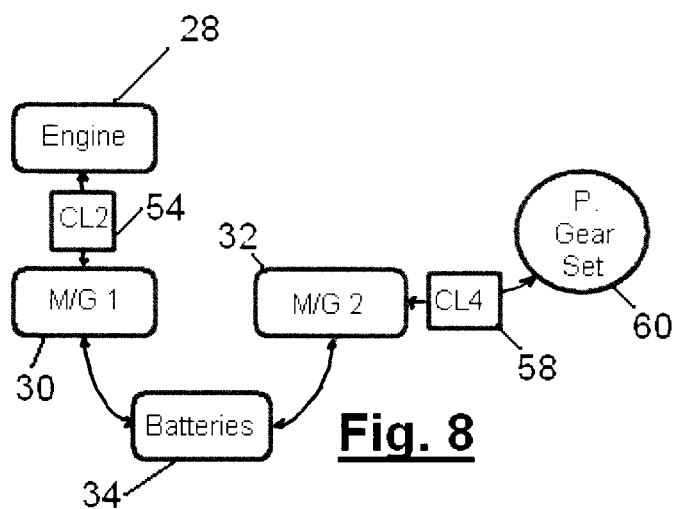
FIG. 8 is a diagram of certain elements shown in FIG. 2 in operational condition corresponding to the Urgent SOC configuration in the third column of TABLE I.

FIG. 8 is a diagram illustrating certain elements of FIG. 2 which are operational to place drive train 20 in the Urgent SOC configuration described in the third column of TABLE I. First clutch 52 and third clutch 56 are disengaged. Second clutch 54 and fourth clutch 58 are engaged. IC engine 28 drives first electric motor/generator 30 as an electric generator to charge batteries 34, and second electric motor/generator 32 operates as a traction motor powered by batteries 34 to provide the entire drive for driving drive wheels 26 through clutch 58, planetary gear set 60, and transmission 38.

Figure 9:
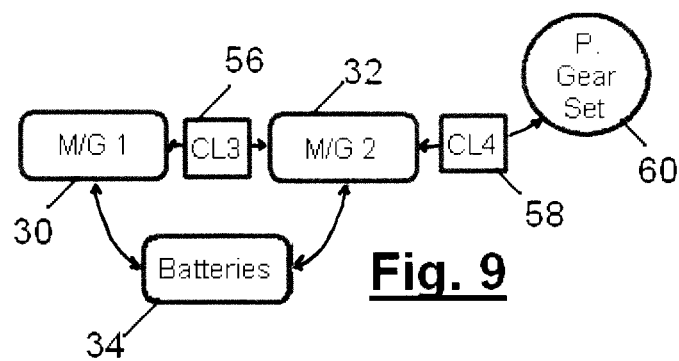
FIG. 9 is a diagram of certain elements shown in FIG. 2 in operational condition corresponding to the Mid-Load configuration in the fourth column of TABLE I.

FIG. 9 is a diagram illustrating certain elements of FIG. 2 which are operational to place drive train 20 in the Mid-Load configuration described in the fourth column of TABLE I. First clutch 52 and second clutch 54 are disengaged. Third clutch 56 and fourth clutch 58 are engaged. With the mechanical coupling of first electric motor/generator 30 to second electric motor/generator 32 provided by third clutch 56, both operate as traction motors powered by batteries 34 to provide the entire drive for driving drive wheels 26 through clutch 58, planetary gear set 60, and transmission 38.

Figure 10:
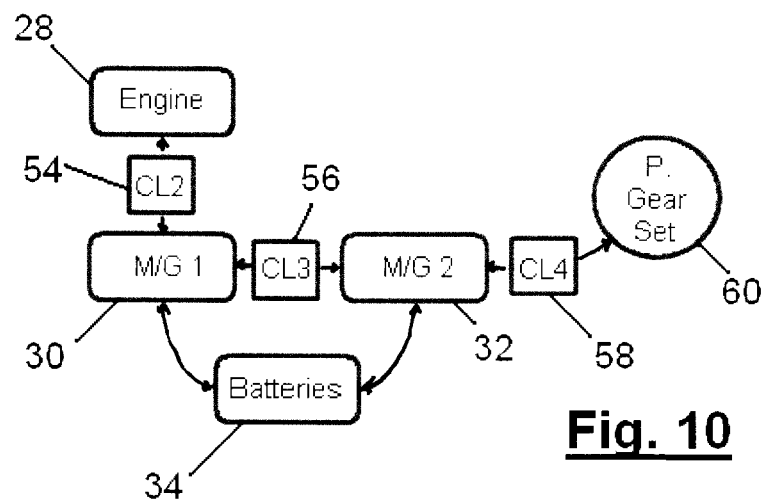
FIG. 10 is a diagram of certain elements shown in FIG. 2 in operational condition corresponding to the Max. Load configuration in the fifth column of TABLE I.

FIG. 10 is a diagram illustrating certain elements of FIG. 2 which are operational to place drive train 20 in the Max. Load configuration described in the fifth column of TABLE I. First clutch 52 is disengaged. Second clutch 54, third clutch 56, and fourth clutch 58 are engaged. Second electric motor/generator 32 operates as a traction motor powered by batteries 34 for driving drive wheels 26 through clutch 58, planetary gear set 60, and transmission 38 while IC engine 28 drives first electric motor/generator 30 and in doing so, not only causes first electric motor/generator 30 to charge storage batteries 34 but also to contribute to driving drive wheels 26 by virtue of its coupling to second electric motor-generator 32 via third clutch 56.

Figure 11:
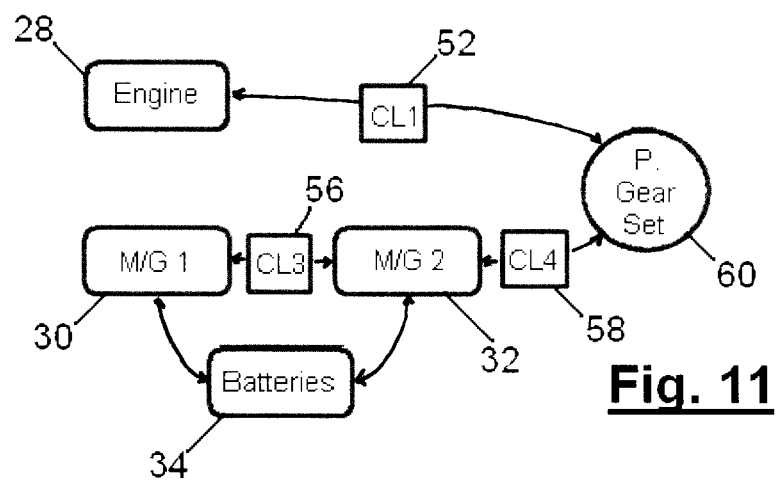
FIG. 11 is a diagram of certain elements shown in FIG. 2 in operational condition corresponding to a Heavy Load configuration in the sixth column of TABLE I.

FIG. 11 is a diagram illustrating certain elements of FIG. 2 which are operational to place drive train 20 in the Heavy Load configuration described in the sixth column of TABLE I. First clutch 52, third clutch 56, and fourth clutch 58 are engaged. Second clutch 54 is disengaged. First electric motor/generator 30 and second electric motor/generator 32 operate as traction motors powered by batteries 34 to drive drive wheels 26 through fourth clutch 58, planetary gear set 60, and transmission 38, and IC engine 28 drives drive wheels 26 through first clutch 52, planetary gear set 60, and transmission 38.

TABLE I

| Comment | Light Load | Urgent SOC | Mid-Load | Max. Load | Heavy Load |
| --- | --- | --- | --- | --- | --- |
| Configuration | Series/Par | Series | Parallel | Parallel | Parallel |
| Propelling Source | Motor/Gen 32 | Motor/Gen 32 | Both Motor/Gen | Both Motors Engine | Both Motors Engine |
| Charging Source | Motor/Gen 32 in Regen mode | Motor 32 in Regen mode, motor 30 in generator mode | Both motors in Regen mode | Motor 32 in Regen mode, motor 30 in generator mode | Both motors in Regen mode |
| Clutch 52 | Disengaged | Disengaged | Disengaged | Disengaged | Engaged |
| Clutch 56 | Disengaged | Disengaged | Engaged | Engaged | Engaged |
| Clutch 54 | Disengaged | Engaged | Disengaged | Engaged | Disengaged |
| ACC/TP % | 20 | 50 | 50 | 80 | 60 |
| SOE/SOC % | 80 | 20 | 80 | 50 | 70 |
| Propelling S. | 150 | 150 | 300 | 471 | 471 |
| Charging S | 15 | 165 | 30 | 165 | 30 |
| Propel less charging | 135 | −15 | 270 | 306 | 441 |
| Possible PCB | 100.00% | 0.00% | 90.00% | 80.00% | 90.00% |

Maintaining batteries 34 SOC is subject to various constraints including the present SOC of the traction batteries 34 and a dynamic limit on the rate at which the traction batteries 34 can accept charge. The traction batteries 34 and engine 28 can be selected so that the engine can be run at its most efficient brake specific fuel consumption during pure charging operation up to a nominal SOC, usually 80% of a full charge. Thus the dynamic limit on the rate of charge can be disregarded during periods when both charging and propulsion are demanded from the drive train 20. The hybrid controller 48 monitors batteries 34 SOC and when charging of batteries 34 is indicated allocates available torque from the engine 28 or from the drive wheels 26 during dynamic regenerative braking to motor/generators 30 and/or 32 to generate electricity for charging traction batteries 34.

Operator demand for power on drive train 20 power is a function of accelerator/throttle position (ACC/TP). ACC/TP is an input to the ESC 24 which passes the signal to the hybrid supervisory control module 48. Where engine 28 is supplying power both for propulsion and for charging of the traction batteries 34. An allocation of the available power from engine 28 is made by the hybrid supervisory control module 48.

To that end a control output, Propel-Charge Bias (PCB), is trained by a neural network, fuzzy logic module (see FIG. 3), or some other non-linear function. Two input operating values or parameters are used to determine PCB. The first is SOE of the "Rechargeable Energy Storage System (RESS)." This corresponds to the SOC of traction batteries 34 in FIG. 2. The second is ACC/TP which represents the propulsion request by the driver of the vehicle. PCB is determined through a software module which may be resident in and executed by the hybrid supervisory control module 48. One way to view PCB is that it represents what proportion of propulsion should be provided in response to operator/driver demand (ACC/TP) and to use the rest to charge the traction batteries 34. PCB is a non-linear function of SOC and ACC/TP. Changes in the PCB implemented by altering the configuration of drive train 20, if possible, can have a perceptible effect on vehicle performance. A low PCB will result in a weak response to operator increases in ACC/TP. Values from Table 1 represent a particular selection of engine and motors, but can be normalized to a percentage scale. As one example, a PCB of 100% in response to ACC/TP of 100% can be met only by applying both motor/generators 30, 32 and engine 28 fully to propulsion. A PCB of 100% implies that the battery 34 SOC indicates an effective full charge.

Figure 3:
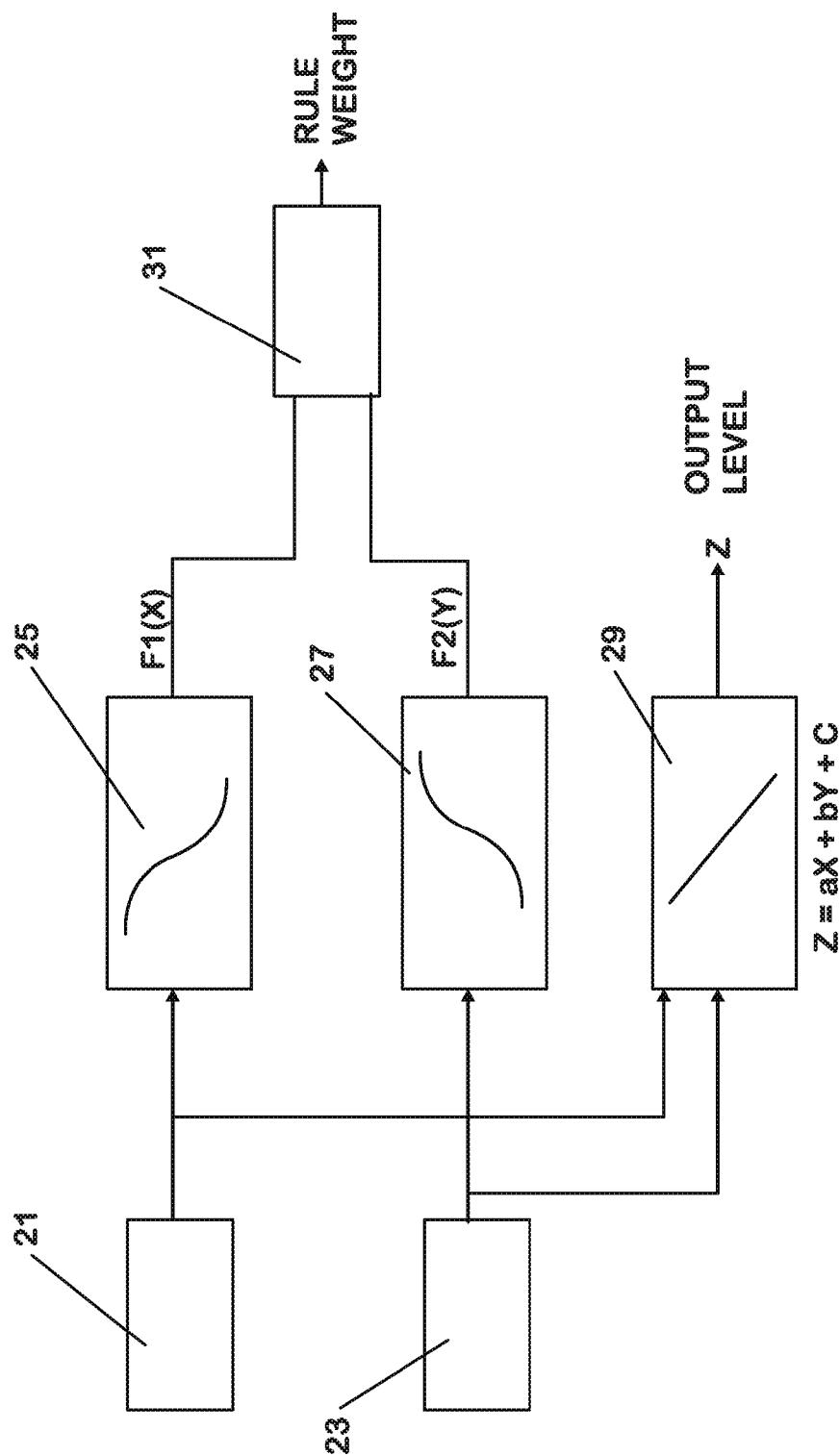
FIG. 3 is a diagram of logic relating to determination of propel-charge bias for a vehicle.
Figure 4:
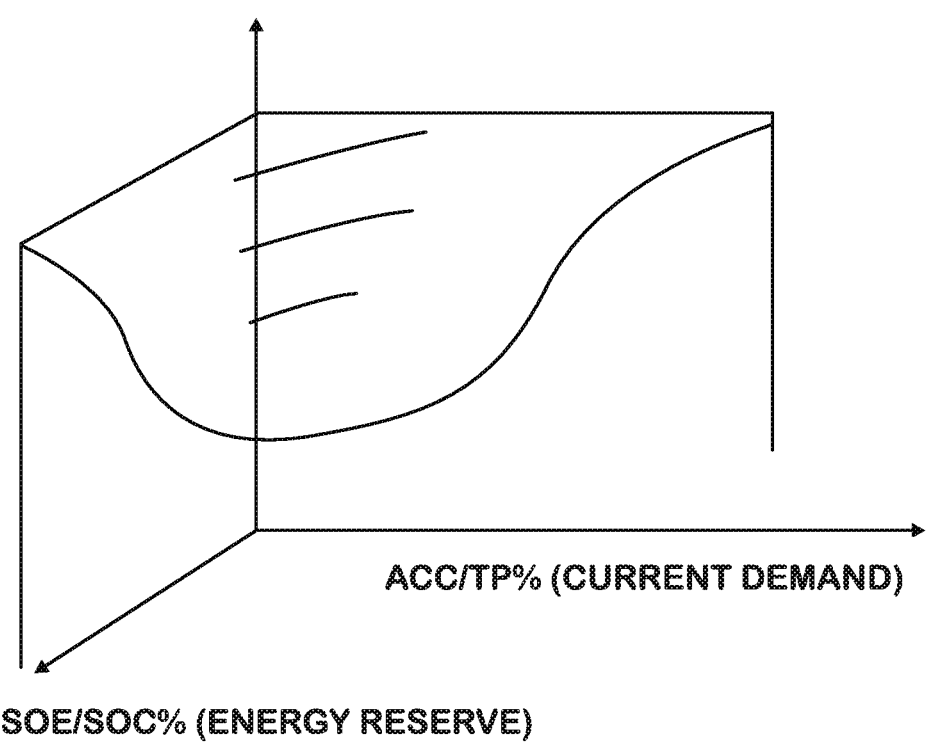
FIG. 4 is a projection of a three axis graph of determination of propel-charge bias from battery state of charge and acceleration/throttle position on a vehicle.
Figure 5:
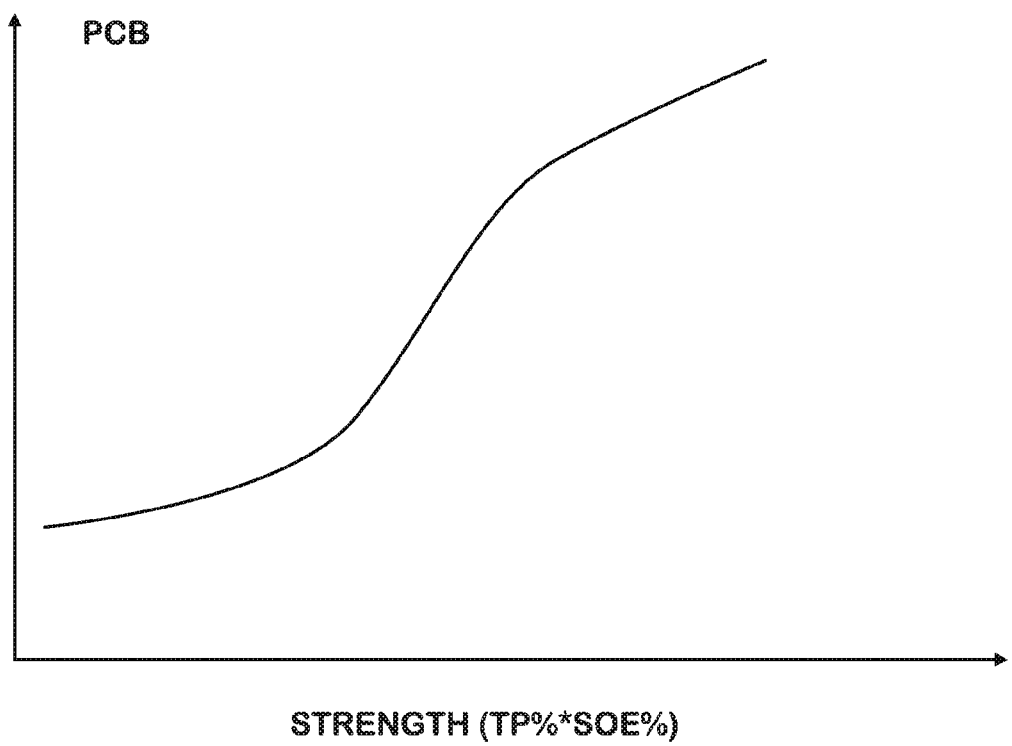
FIG. 5 is a two axis graph of drive train strength.

Referring to FIGS. 4 and 5, PCB as a function of SOC and ACC/TP can be represented in three axes or two axes graphs. FIG. 4 illustrates increasing PCB with increasing ACC/TP % as long as SOE/SOC is high (low concurrent need for charging). With an increasing demand for charging, stemming from a lower SOE/SOC, PCB falls for a constant ACC/TP %. FIG. 5 conflates the representation of FIG. 4 into a two axes graph by introducing a transformational axis termed "Strength" which is the product of ACC/TP % and SOE/SOC %. PCB is usually a monotonically increasing function with Strength. It can be computed through neural network algorithms or fuzzy logic algorithms as shown in FIG. 3.

Figure 6:
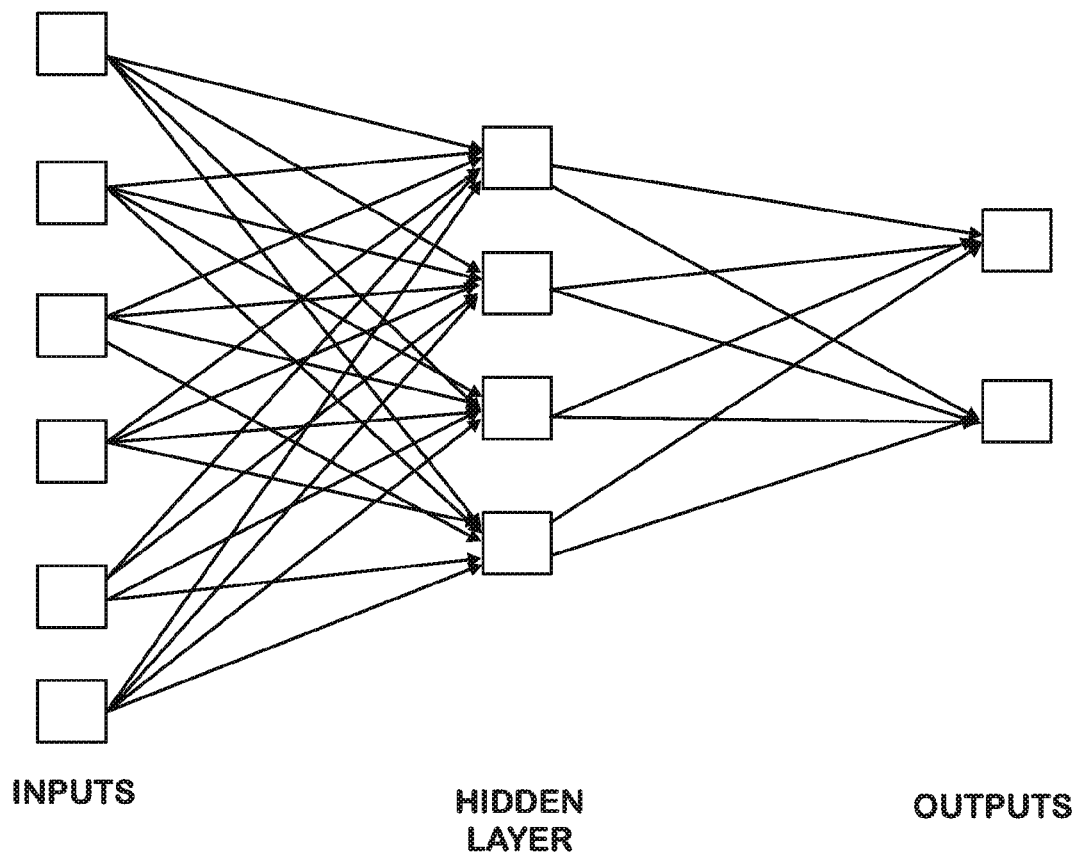
FIG. 6 is a general diagram of a neural network.

Referring to FIG. 3, a high level view of a fuzzy logic module relating ACC/TP % (X) 21 and SOE/SOC (Y) 23 to generate the rule weight 31 and the output level 29 is shown. The relationship is a framework allowing application of fuzzy logic to vehicle operational history to determination of the functions F1 and F2. The functions F1(X) 25 and F2(Y) 27 are non-linear, though the exact form of the relations will be generated by data collected from use of the vehicle. Table I is an example of five data points. A function can be regressed onto a collection of many such points. Operator habits for a particular vehicle thus inform the particular functional relationship between SOC and ACC/TP and PCB. However, certain fixed points can be part of the function. For example, an SOC of 20% for the traction batteries 34 with present battery technology may be considered the minimum tolerable level of charge, resulting in an automatic PCB of 0%. Under such circumstances the vehicle cannot be moved unless battery 34 charging is overridden, for example by applying the throttle/accelerator pedal fully. An SOC of 80% provides an automatic PCB of 100% resulting in battery charging occurring only due to regenerative braking and not due to engine 28 operation. FIG. 6 illustrates a generalized neural network such as may be applied to determination of PCB.

What is claimed is:

1. A hybrid vehicle comprising:
    drive wheels for propelling the vehicle along an underlying surface;
    a drive train comprising a combustion engine, a first electric motor/generator, a second electric motor/generator, a planetary gear set having a first input, a second input, and an output, a first clutch coupling the combustion engine with the first input of the planetary gear set, a second clutch coupling the combustion engine with the first electric motor/generator, a third clutch coupling the first electric motor/generator with the second electric motor/generator, a coupling which couples the second electric motor/generator with the second input of the planetary gear set, and a transmission coupling the output of the planetary gear set with the drive wheels;
    electric storage batteries;
    and a control system for selectively engaging and disengaging each of the first, second, and third clutches to place the drive train in a selected one of multiple possible drive train configurations as a function of state of charge of the electric storage batteries and a request for propulsion of the vehicle in which the possible drive train configurations comprise: 1) a first configuration in which the first, second, and third clutches are disengaged and the second electric motor/generator operates as a traction motor powered by the electric storage batteries to provide the entire drive for driving the drive wheels; 2) a second configuration in which the first and third clutches are disengaged, the second clutch is engaged, the combustion engine drives the first electric motor/generator as an electric generator to charge the electric storage batteries, and the second electric motor/generator operates as a traction motor powered by the electric storage batteries to provide the entire drive for driving the drive wheels; 3) a third configuration in which the first and second clutches are disengaged, the third clutch is engaged, and both the first electric motor/generator and the second electric motor/generator operate as traction motors powered by the electric storage batteries to provide the entire drive for driving the drive wheels; 4) a fourth configuration in which the first clutch is disengaged, the second and third clutches are engaged, the second electric motor/generator operates as a traction motor powered by the electric storage batteries for driving the drive wheels while the engine drives the first electric motor/generator and in doing so, not only causes the first electric motor/generator to charge the electric storage batteries but also to contribute to driving the drive wheels by virtue of its coupling to the second electric motor/generator via the third clutch; and 5) a fifth configuration in which the first and third clutches are engaged, the second clutch is disengaged, the first electric motor/generator and the second electric motor/generator operate as traction motors powered by the electric storage batteries to drive the drive wheels, and the engine drives the drive wheels through the first clutch.

2. The vehicle as set forth in claim 1 in which the coupling which couples the second electric motor/generator with the second input of the planetary gear set comprises a fourth clutch.

* * * * *